United States Patent
Laksono et al.

(10) Patent No.: US 6,747,654 B1
(45) Date of Patent: Jun. 8, 2004

(54) MULTIPLE DEVICE FRAME SYNCHRONIZATION METHOD AND APPARATUS

(75) Inventors: Indra Laksono, Richmond Hill (CA); Milivoje Aleksic, Richmond Hill (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/553,977

(22) Filed: Apr. 20, 2000

(51) Int. Cl.[7] .............................. G06F 15/16
(52) U.S. Cl. .................. 345/502; 345/522; 345/539; 345/531
(58) Field of Search .................. 345/503, 505, 345/506, 520, 522, 531, 539, 553, 1.1, 1.3, 2.1, 3.1, 502

(56) References Cited

U.S. PATENT DOCUMENTS

| | | | | |
|---|---|---|---|---|
| 5,523,769 A | * | 6/1996 | Lauer et al. ............ | 345/1.3 |
| 5,546,530 A | * | 8/1996 | Grimaud et al. ........ | 345/505 |
| 5,757,385 A | * | 5/1998 | Narayanaswami et al. | 345/505 |
| 5,784,035 A | * | 7/1998 | Hagiwara et al. ...... | 345/1.3 |
| 5,793,386 A | * | 8/1998 | Larson et al. ......... | 345/553 |
| 5,956,046 A | * | 9/1999 | Kehlet et al. ......... | 345/502 |
| 5,969,728 A | * | 10/1999 | Dye et al. ............ | 345/553 |
| 6,023,281 A | * | 2/2000 | Grigor et al. ......... | 345/543 |
| 6,128,026 A | * | 10/2000 | Brothers, III ......... | 345/539 |
| 6,157,393 A | * | 12/2000 | Potter et al. ......... | 345/505 |
| 6,331,854 B1 | * | 12/2001 | Rogers et al. ......... | 345/473 |
| 6,473,086 B1 | * | 10/2002 | Morein et al. ......... | 345/505 |

OTHER PUBLICATIONS

IBM TDB, "Synchronnization of Multiple Rendering Models in Multiple Processes", vol. 38, No. 6, Jun. 1995, pp. 643–648.*

* cited by examiner

Primary Examiner—Ulka J. Chauhan
(74) Attorney, Agent, or Firm—Vedder, Price, Kaufman & Kammholz, P.C.

(57) ABSTRACT

A multiple device frame synchronization method and apparatus utilizes events completion signaling between multiple devices, such as multiple graphics processors. The signaling serves as a stall command for stalling graphics data rendering commands in a command FIFO of the rendering engine of a graphics processor in response to a rendering complete signal, or other event signal generated by the other graphics processor. Accordingly, the processor that, for example, completes a current frame relay is stalled until the other processor has completed its rendering function for a particular odd line, even line, entire frame or partial frame as desired.

23 Claims, 3 Drawing Sheets

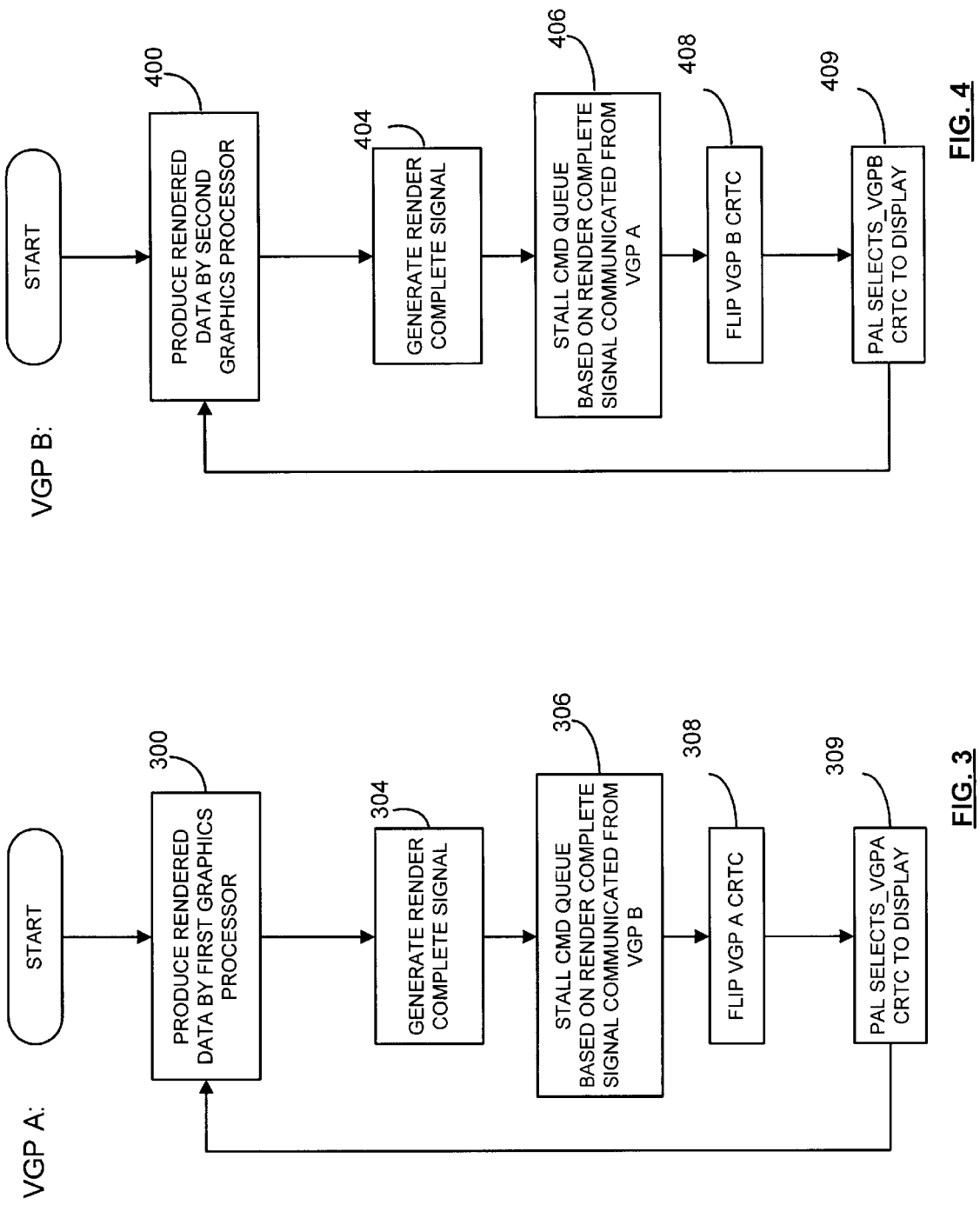

MULTIPLE DEVICE FRAME SYNCHRONIZATION METHOD AND APPARATUS

FIELD OF THE INVENTION

The invention relates generally to video graphics processors and more particularly to method and apparatus for providing synchronization between multiple graphics processors.

BACKGROUND OF THE INVENTION

Video graphic processors (VGPs) are used to render video signals to be displayed on display devices such as computer monitors. In operation, VGPs will generally receive graphics information from a system, such as a computer system, and perform the necessary graphics calculations upon the received information in order to render graphics signals. Graphics calculations are performed for many different types of information, including lighting information, user view information, texture information, and Z-plane data information, which indicates the position order of one object relative to another object. Once all calculations have been performed upon an object, the data representing the object to be displayed is written into a frame buffer. Once the graphics calculations have been repeated for all objects associated with a specific frame, the data stored within the frame buffer is rendered to create a video signal that is provided to the display device.

The amount of time taken for an entire frame of information to be calculated and provided to the frame buffer becomes a bottleneck in a video graphics system as the calculations associated with the graphics become more complicated or the total area of the objects drawn become very high. Contributing to the increased complexity of the graphics calculations is the increased need for higher resolution video, as well as the need for more complicated video, such as 3-D video or stereoscopic video. The video image observed by the human eye becomes distorted or choppy when the amount of time taken to provide an entire frame of video exceeds the amount of time which the display must be refreshed with a new graphic, or new frame, in order to avoid perception by the human eye.

The use of multiple graphic adapters has been proposed in order to provide data to the frame buffer at a rate fast enough to avoid detection by the human eye. Current methods of using multiple graphics devices have partitioned the graphics associated with each such that each one of the multiple processors is responsible for rendering a portion of each frame. Each processor renders a portion of a frame in order to assure data is provided to the frame buffer within a required amount of time.

Once such partitioning method split the screen into odd and even display lines, whereby one video adapter would render all of the odd lines associated with a specific frame, while the second device would render all of the even lines associated with the frame. Another prior art method split the screen into two discrete areas, such as a top and a bottom half, whereby each display device would be responsible for rendering one portion of the screen. However, problems with these implementations occur.

One problem with present implementations is that all of the video data from the system needs to be sent to both of the data graphics devices. For example, in the implementation where the graphics device split the odd and even lines it is necessary for each video device to receive the object's video information from the system. The amount of data sent by the system to the graphics adapters in effect doubles, because each graphics adapter needs all the information. In an implementation where the data is be sent to both devices at the same time, there is hardware and/or software overhead associated with controlling the reception of the data.

Workload distribution is another problem associated with known graphics systems having multiple adapters. When each of the two graphics devices is processing a portion of a single frame, a likelihood exists that the amount of work to be done by one of the processors for a given frame will be significantly greater than the amount of work being done by the other video device. For example, where a first video device is to render the video for the top half of the screen, it is likely that it will have fewer calculations to perform than the device calculating the graphics for the bottom half of the frame. One reason for this disparity in workload distribution is because it is common for the top half of a frame to contain skyscape information which is less computationally intensive than for the objects associated with action video often found on the bottom half of a display device or frame. When the workload distribution is not even, one graphics device will in effect end up stalling while the second graphics device completes its calculations. This workload balancing problem yields inefficient use of total rendering capabilities of multiple chips.

Yet another problem associated with the prior embodiments is that each of the graphics devices has to calculate the shape of each and every object on the frame. Each device must calculate each object's shape in order to determine whether or not the object, or a portion of the object, must be further processed by the graphics engine associated with the graphics device. An associated problem, is that when an object straddles the demarcation line between an area that the first graphics device is to process and an area that the second graphics device is to process it is necessary for both devices to process the object. For example, when a portion of an object is in the top half of the screen, and a portion on the bottom half of the screen, calculations associated with the object are calculated by both graphic devices.

Multi-graphic processor devices, each having 3D rendering engines, typically employ page flipping as known in the art. For example, each video processing device may process alternate frames that are being displayed on one or more display devices. Page flipping occurs within a graphics processor and between multiple graphics processors. Accordingly, buffers are designated as a front buffer and a back buffer. The front buffer typically contains a frame currently being displayed whereas the back buffer contains frames that are receiving rendered data. Accordingly, when parallel processing is performed by multiple video graphics processors, output from one processor, whether it is a line, frame or partial frame one graphics processor is flipped in favor of the output from the other processor. A page flip is typically carried out during a vertical synchronization pulse. However, a problem can arise when two rendering engines are each rendering alternate frames of different data, one rendering engine may complete rendering before the other although the other is supposed to provide the frame that is displayed next. For example, with a 100 Hertz refresh rate, a flip may occur every $\frac{1}{100}$th of a second. Since rendering can be variable based on the complexity of the frame, there may not always be a frame available from the other graphics processor when needed so the system must be display the current frame again from the other chip. This can cause great inefficiency in a multi-processor environment.

Moreover, typically, the host processor writes the rendering commands and page flip commands to a command queue processor for each graphics processor. Also, programmable array logic (PAL) is operatively coupled to receive output from each chip in the order required for display. The programmable array logic typically selects which frame to send to a display device as received from a frame buffer associated with each of the multiple graphics processors. Accordingly, the last command in a command queue indicates that the frame is rendered and that a flip can occur. As known in the art, the host processor typically queues the commands for the rendering engines in a command FIFO queue for each frame based on commands from, for example, a 3D video game or other source using a 3d rendering engine.

Because the queue based flip command is queued with the rendering commands, each chip or graphics processor does not typically know when the other processor is finished. Accordingly, the frame that is supposed to be displayed subsequent to a current frame may be completely rendered before a current frame is rendered. One solution has been proposed to have the host processor stall and wait until it receives notification based on when it detects which frame has been displayed. However, this typically requires that the host processor needs to poll each processing chip to determine when or what stage it is in. This can drastically slow down performance of a system. It is important to efficiently operate the host processor and the rendering engines.

It is also known to divide a frame either horizontally or vertically and have one graphics processor provide, for example, one half of the frame and have the other processor provide the other half of the frame. For example, one processor can provide the rendered lines for the first half of the horizontal lines for a frame and the other graphics processor can provide the other half of the rendered lines for the same frame. Alternatively, a portion of each horizontal line can be provided by an alternate graphics processor if desired. Further, the host processor still typically includes a flip page command in the command queue for both processing devices. If each graphics processing device has a variable render time, a host processor stall typically must be employed. Accordingly, with variable rendering times, synchronization may not be provided.

Therefore, it would be desirable to have a method and apparatus that allows the use of multiple video graphics devices that overcome the problems associated with the prior art.

BRIEF DESCRIPTION OF THE DRAWINGS

The invention will be more readily understood with reference to the following drawings wherein:

FIGS. 3 and 4 illustrate flow charts of both VGPs performing the operation of the multi-graphics processor system shown in FIG. 1.

DETAILED DESCRIPTION OF A PREFERRED EMBODIMENT OF THE INVENTION

A multiple device frame synchronization method and apparatus utilizes event completion signaling between multiple devices, such as multiple graphics processors. The signaling serves as a stall command for stalling graphics data rendering commands in a command FIFO of the rendering engine of a graphics processor in response to a rendering complete signal, or other event signal generated by the other graphics processor. Accordingly, the processor that, for example, completes a current frame early is stalled until the other processor has completed its rendering function for a particular odd line, even line, entire frame or partial frame as desired.

Figure 1:
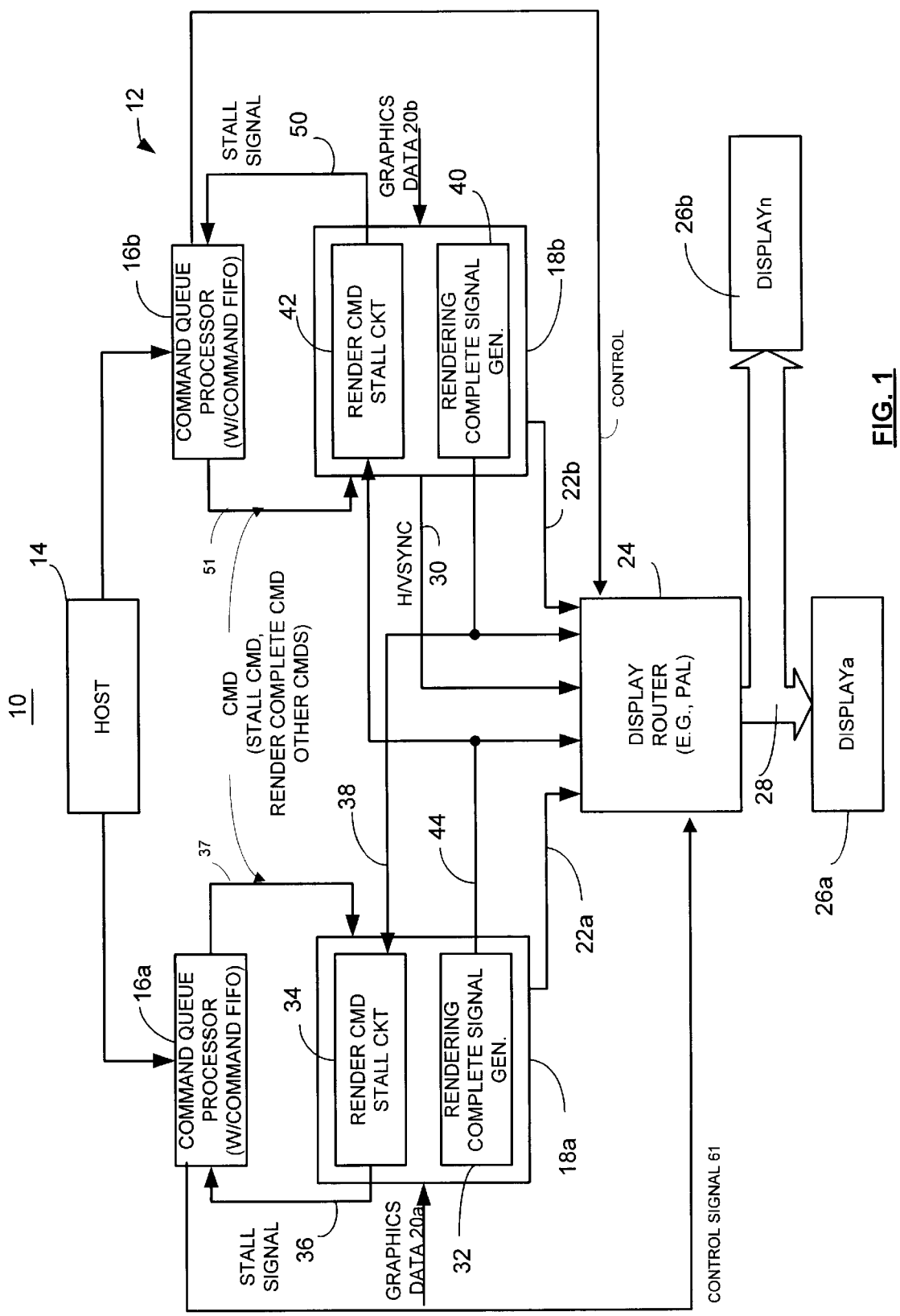
FIG. 1 is block diagram of one example of a multi-graphics processor system in accordance with one embodiment of the invention.

FIG. 1 illustrates a processing system 10 that includes a multi-graphics processor system 12, such as a computer system, television system, or any other processing system. The system 10 includes, for example, a host processor 14 which sends rendering commands to command FIFOs in command queue processors 16a and 16b. The command queue processors 16a and 16b are associated with different graphics processors 18a and 18b, respectively. Each of the graphics processors 18a and 18b have an input 20a and 20b operatively coupled to receive graphics data. As used herein graphics data includes but is not limited to graphics data, video data, or any other suitable data for rendering. Each of the graphics processors 18a and 18b also include outputs 22a and 22b to output rendered data along with suitable synchronization data to a display data router 24, such as a PAL. The display data router 24 routes display data for one or more display devices 26a and 26b as obtained from the plurality of graphics processors 18a and 18b. Display data 28 comes from either of the graphics processors 18a or 18b as selected by the display data router 24. The display data router 24 also receives suitable synchronization information such as horizontal or vertical synchronization information 30, as known in the art to provide suitable timing for page flipping.

The graphics processor 18a includes a rendering complete signal generator 32 and a rendering command stall circuit 34. The render command stall circuit 34 stalls graphics data rendering commands in the command queue processor 16a when it sees a stall command 36 so that rendering commands to a rendering engine of are graphics processor 18a are stalled until it receives a response to a rendering complete signal 38 generated by the rendering complete signal generator 40 associated with the other graphics processor 18b. The stall command 36 is queued and sequenced by the Host CPU 14.

Accordingly, graphics processor 18b also includes a rendering complete signal generator 40 and a rendering command stall circuit 42. The rendering command stall circuit 42 also stalls graphics data rendering commands to a rendering engine (through command queue processor 16b) of the graphics processor 18b in response to the rendering complete signal 44 generated by the rendering complete signal generator 32 of graphics processor 18a. The rendering complete signal generator 32 generates the rendering complete signal 44. Similarly, the rendering complete signal generator 40 generates the rendering complete signal 38.

The display data router 24 also receives the render complete signals 38 and 44. The display data router 24 (e.g., a PAL) upon receiving the render complete signals 38 and 44, decides that a frame is ready for display. This usually happens on the next vertical blank period of the raster display.

In this example, graphics processor 18a serves as a master whereas graphics processor 18b serves as a slave. The master/slave arrangement may be indicated by a suitable control bit.

The render command stall circuits 34 and 42 include suitable latches that are operatively coupled to receive the rendering complete signals 38 and 44, respectively. The render command stall circuit 42 generates a command queue stall signal 50 for the command queue processor 16b in response to receiving the render complete signal 44.

The rendering complete signals 38 and 44 are generated in response to whether a complete frame has been rendered by a respective graphics processor, or, if desired, for any other event. For example, the rendering complete signals 38 and 44 may be generated each time an even line is rendered by a respective graphics processor, an odd line is rendered by a respective graphics processor, a half frame is rendered or a partial frame is rendered, depending upon the type of flipping desired. Depending upon the type of flipping desired, the horizontal or vertical synchronization information 30 is provided for the display data router 24 along with any other suitable synchronization needed to allow the alternating of frames, even and odd lines between the two processors, partial frames between the two processors, or half frames between the two processors.

Figure 2:
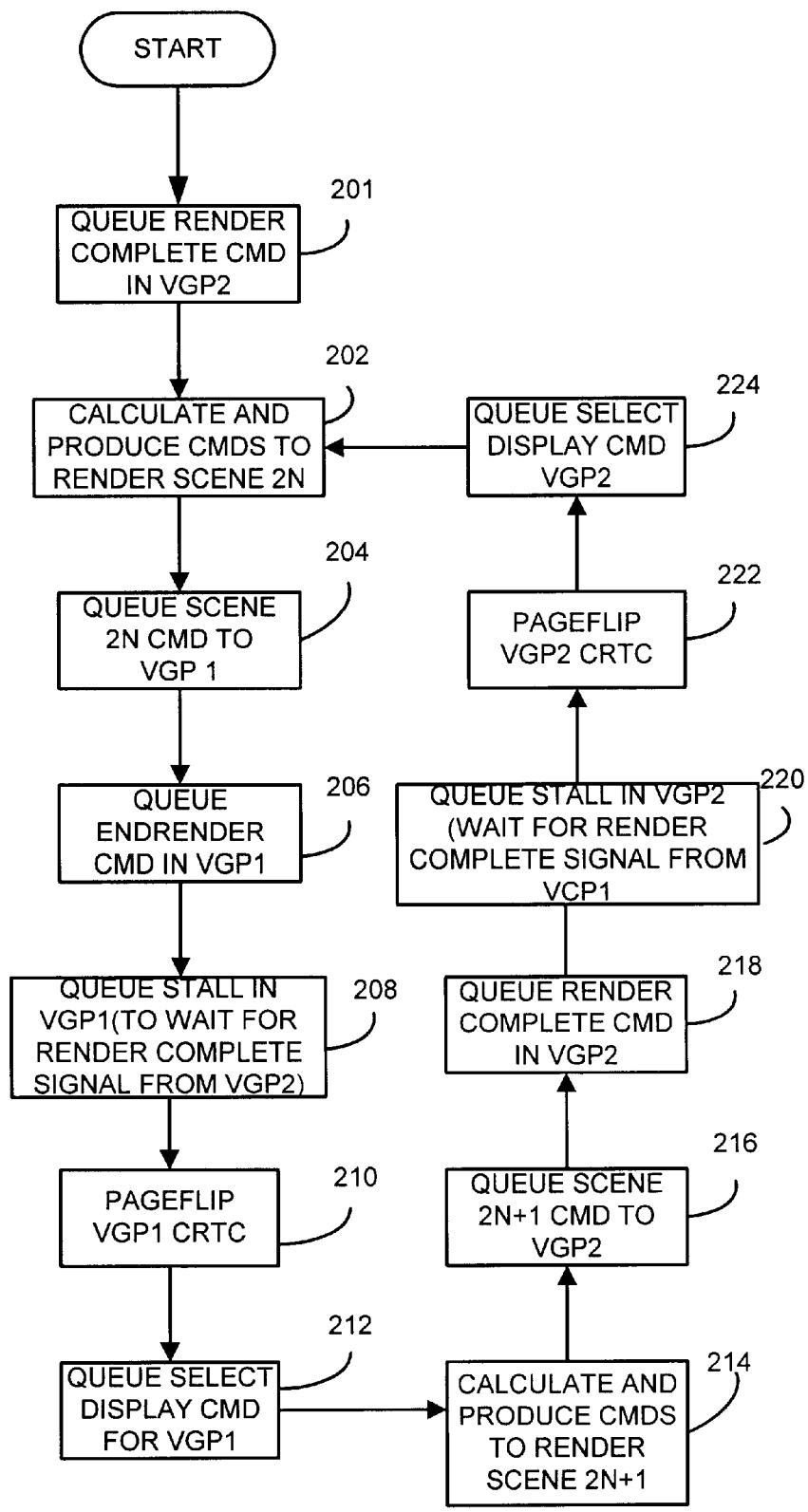
FIG. 2 illustrates a flow chart of the host processor facilitating a rendering of multiple frames sent to the multi-graphics processor system shown in FIG. 1.

As shown in FIG. 2, a control software program, operational by the host processor (or any other processing device) is used for sequencing the drawing and control commands that allows the rest of the hardware to function correctly. In block 201, a Render Complete Command, indicating that all rendering commands for a given rendering sequence have been calculated, is queued up in VGP2 command queue processor 16b to prime the state machine. The main render and control loop occurs from blocks 202 to 224. In block 202, the render commands are calculated and queued up in the command queue processor 16a of VGP1 18a. In block 204, the commands are routed to be read and processed by VGP1. In block 206, the Render Complete Command is queued up to VGP1. In block 208, a STALL CMD is queued into VGP1. The Stall Command makes VGP1 wait for a render complete signal from VGP2. In other words, a stall command causes a stall signal to stall the command queue processing unit1 a render complete signal is received from the other graphics processor. In block 210, the PageFlip command in VGP1 is queued. In block 212, a display command (Select Display Cmd) is queued up. The Select Display CMD in block 212, when received by VGP1 will cause a command signal 61 to the DISPLAY ROUTER 24 (see FIG. 1, display 26a) to display output data 22a from VGP1 on the next appropriate interval (the horizontal or vertical synch of the display). Further, the same similar sequence happens on VGP2 as shown in blocks 214 to 224, after which the process returns to block 202 and the render loop starts again. The synchronization is achieved by the Rendering Complete Command in blocks 206 and 218, the stall command (STALL) in blocks 208 and 220 and the associated stall signals and render complete signals. When block 206 is carried out by VGP1 in the queue, this will cause the render complete signal 44 to be sent to VGP2, when VGP2 is in or is about to process as shown in block 220, the render complete signal generated by the step 206 will cause VGP2 to continue processing. Similarly, the render complete signal 38 generated by VGP2 when it processes as shown in block 218 will go to VGP1. When VGP1 is in or is about to process as shown in block 208, it will continue if the render complete signal 38 from the process of block 218 has already been sent.

As a note to FIG. 2, the order of blocks 206 and 208 can be moved without affecting the basic loop. As an example, block 206 could come after block 212 and block 218 could come after block 224 and before block 202. Any other suitable ordering of the steps may also be done if desired.

As shown in FIGS. 3 and 4, one example of the method of the operation of the multi-graphics processor apparatus 12 is shown. Both video graphics processors (VGPs) are shown to follow a predetermined path, stalling if necessary at the appropriate times. As shown in block 300 on a first processor 18a (or 18b), the method includes rendering data by one of the graphic processors to produce rendered data for display on the display device. As shown in block 400 on a second processor 18b (or 18a), the method includes rendering data by the other graphics processor to produce additional rendered data for display on a display device.

Accordingly, to effect proper synchronization of rendered information to the display router for display, either of the graphics processors generates rendering complete signals 38 or 44 for the other processor to stall processing of graphics data rendering commands to a rendering engine of the other processing device if necessary. The Render Complete signal 38 is only generated in response to the Render Complete CMD. The Render Complete CMD is only queued up by the CPU to mark the end of rendering of a scene in a frame. Since the slave processor typically must provide the frame 2N+1 at a time later than the master's frame 2N, if the slave processor finishes rendering of frame 2N+1, sooner than the master processor 18a, the slave graphics processor needs to wait until the master has completed. This wait is enforced when the slave graphics processor processes the STALL CMD as queued up as shown in block 220 of FIG. 2. The STALL CMD causes the stall signal to stall the CMD QUEUE processing to halt until a Render complete signal arrives from the other processor.

As shown in block 306, the master video graphics processor stalls its command queue processor in response to a stall command queued by the host processor based on the render complete signal from the slave processor. As shown in block 308, the master processor executes a page flip to flip the frame for the CRTC. The display router then selects the frame from the master processor for display as shown in block 309. Similar steps are performed by the slave processor as shown in blocks 406–409. Accordingly, the processor that, for example, completes a current frame early is stalled until the other processor has completed its rendering function for a particular odd line, even line, entire frame or partial frame as desired, by insertion of a stall command that is queued by the host CPU. The master graphics processor stalls its command queue processor in response to a stall command processed by the command queue processor. The master graphics processor generates the rendering complete signal 44 for the slave graphics processor in response to a render complete command processed by the master command queue processor. Similarly, the slave graphics processor stalls its command queue processor in response to a stall command processed by the slave command queue processor. The slave graphics processor generates the rendering complete signal 38 for the master graphics processor in response to a render complete command processed by the slave command queue processor to allow the master to stall until the render complete signal from the slave is received. The system and methods described unstall graphics data rendering commands to a rendering engine of the master graphics processor in response to the rendering complete signal generated by the slave graphics processor. Also, unstall graphics data rendering commands to a rendering engine of the slave graphics processor in response to a rendering complete signal generated by the master graphics processor.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A multi-graphics processor system comprising:
   at least a first graphics processor having a first input operatively coupled to receive graphics data for rendering and a first output coupled to output rendered data for at least a first display device and including a first rendering complete signal generator and a first render command stall circuit;
   at least a second graphics processor, operatively coupled to the first graphics processor having a second input coupled to receive graphics data for rendering and a second output operatively coupled to output rendered data for the first display device, including a second rendering complete signal generator and a second render command stall circuit; and
   at least one display router, operatively coupled to the first and second outputs to route display data for the first display device generated by either of the first or second graphics processors.

2. The multi-graphics processor system of claim 1 wherein the first render command stall circuit stalls graphics data rendering commands to a rendering engine of the first graphics processor in response to a second rendering complete signal generated by the second rendering complete signal generator.

3. The multi-graphics processor system of claim 2 wherein the second render command stall circuit stalls graphics data rendering commands to a rendering engine of the second graphics processor in response to a first rendering complete signal generated by the first rendering complete signal generator.

4. The multi-graphics processor system of claim 3 wherein the first processor includes a first rendering complete latch operatively coupled to receive the second rendering complete signal.

5. The multi-graphics processor system of claim 1 wherein the second processor includes a second rendering complete latch operatively coupled to receive the first rendering complete signal.

6. The multi-graphics processor system of claim 1 wherein at least one of the first and second rendering complete signals is generated in response to at least one of: a complete frame rendered, an even line rendered, an odd line rendered, a half frame rendered and a partial frame rendered.

7. The multi-graphics processor system of claim 2 wherein the first and second graphics processors generate a command stall signal in response to a stall command and also generate the rendering complete signal in response to a render complete command.

8. The multi-graphics processor system of claim 1 wherein the first graphics processor includes a first command queue processor and stalls the command queue processor in response to a stall command processed by the command queue processor and wherein the first graphics processor generates the first rendering complete signal for the second graphics processor in response to a render complete command processed by the first command queue processor.

9. The multi-graphics processor system of claim 8 wherein the second graphics processor includes a second command queue processor and stalls the second command queue processor in response to a stall command processed by the second command queue processor and wherein the second graphics processor generates the second rendering complete signal for the first graphics processor in response to a render complete command processed by the second command queue processor.

10. A method for synchronizing rendered data for display comprising the steps of: rendering data by a first graphics processor to produce rendered data for at least a first display device;
    rendering data by a second graphics processor to produce rendered data for the at least first display device;
    unstall graphics data rendering commands to a rendering engine of the first graphics processor in response to a first rendering complete signal generated by the second graphics processor;
    unstall graphics data rendering commands to a rendering engine of the second graphics processor in response to a second rendering complete signal generated by the first graphics processor; and
    routing the rendered data for display on the first display device as generated by either of the first or second graphics processors.

11. The method of claim 10 wherein at least one of the first and second rendering complete signals is generated in response to at least one of: a complete frame rendered, an even line rendered, an odd line rendered, a half frame rendered and a partial frame rendered.

12. The method of claim 10 including the steps of generating a command stall signal in response to a stall command and also generating the first rendering complete signal in response to a render complete command.

13. The method of claim 10 including the steps of stalling a command queue processor in response to the stall command processed by the command queue processor and generating the first rendering complete signal for the second graphics processor in response to a render complete command processed by the command queue processor.

14. The method of claim 13 including the steps of stalling a second command queue processor in response to a stall command processed by the second command queue processor and wherein the second graphics processor generates the second rendering complete signal for the first graphics processor in response to a render complete command processed by the second command queue processor.

15. A multi-graphics processor system comprising:
    at least a first graphics processor having a first input operatively coupled to receive graphics data for rendering and a first output coupled to output rendered data for at least a first display device and including a first rendering complete signal generator and a first render command stall circuit;
    at least a second graphics processor, operatively coupled to the first graphics processor having a second input coupled to receive graphics data for rendering and a second output operatively coupled to output rendered data for the first display device, including a second rendering complete signal generator and a second render command stall circuit;
    a processor operatively coupled to the first and second graphics processors and operative to provide a stall command and a rendering complete command to the first graphics processor and to provide the stall command and the rendering complete command to the second graphics processor; and
    at least one display router, operatively coupled to the first and second outputs to route display data for the first display device generated by either of the first or second graphics processors.

16. The system of claim 15 The multi-graphics processor system of claim 1 wherein the first render command stall circuit stalls graphics data rendering commands to a rendering engine of the first graphics processor in response to a second rendering complete signal generated by the second rendering complete signal generator.

17. The multi-graphics processor system of claim 15 wherein the second render command stall circuit stalls graphics data rendering commands to a rendering engine of the second graphics processor in response to a first rendering complete signal generated by the first rendering complete signal generator.

18. The multi-graphics processor system of claim 15 wherein the first processor includes a first rendering complete latch operatively coupled to receive the second rendering complete signal.

19. The multi-graphics processor system of claim 15 wherein the second processor includes a second rendering complete latch operatively coupled to receive the first rendering complete signal.

20. The multi-graphics processor system of claim 15 wherein at least one of the first and second rendering complete signals is generated in response to at least one of: a complete frame rendered, an even line rendered, an odd line rendered, a half frame rendered and a partial frame rendered.

21. The multi-graphics processor system of claim 16 wherein the first and second graphics processors generate a command stall signal in response to the stall command and also generate the rendering complete signal in response to the render complete command.

22. The multi-graphics processor system of claim 15 wherein the first graphics processor includes a first command queue processor and stalls the command queue processor in response to the stall command processed by the command queue processor and wherein the first graphics processor generates the first rendering complete signal for the second graphics processor in response to the render complete command processed by the first command queue processor.

23. The multi-graphics processor system of claim 22 wherein the second graphics processor includes a second command queue processor and stalls the second command queue processor in response to the stall command processed by the second command queue processor and wherein the second graphics processor generates the second rendering complete signal for the first graphics processor in response to the render complete command processed by the second command queue processor.

* * * * *